US011169996B2

(12) United States Patent
Chen (10) Patent No.: US 11,169,996 B2
(45) Date of Patent: Nov. 9, 2021

(54) QUERY OPTIMIZER INJECTION FOR DYNAMICALLY PROVISIONED DATABASE CONTAINERS

(71) Applicant: Red Hat, Inc., Raleigh, NC (US)

(72) Inventor: Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 563 days.

(21) Appl. No.: 15/980,379

(22) Filed: May 15, 2018

(65) Prior Publication Data

US 2019/0354623 A1 Nov. 21, 2019

(51) Int. Cl.
*G06F 16/2453* (2019.01)
*G06F 9/50* (2006.01)
*G06F 9/455* (2018.01)
*G06F 16/951* (2019.01)

(52) U.S. Cl.
CPC .... *G06F 16/24549* (2019.01); *G06F 9/45558* (2013.01); *G06F 9/5016* (2013.01); *G06F 9/5094* (2013.01); *G06F 16/951* (2019.01); *G06F 2009/45583* (2013.01); *G06F 2009/45595* (2013.01)

(58) Field of Classification Search
CPC ............. G06F 16/24549; G06F 16/951; G06F 9/5094; G06F 9/45558; G06F 9/5016; G06F 2009/45583; G06F 2009/45595; G06F 9/5044; G06F 2009/45591; G06F 2009/45579
See application file for complete search history.

(56) References Cited

U.S. PATENT DOCUMENTS

| | | | |
|---|---|---|---|
| 9,256,467 B1 | 2/2016 | Singh et al. | |
| 9,647,955 B2 | 5/2017 | Suchter et al. | |
| 9,886,296 B2 | 2/2018 | Clark et al. | |
| 9,959,157 B1* | 5/2018 | Adogla | G06F 9/45558 |
| 2008/0052719 A1* | 2/2008 | Briscoe | H04L 41/0856 718/104 |
| 2013/0057560 A1* | 3/2013 | Chakraborty | G06F 9/455 345/520 |
| 2014/0082614 A1* | 3/2014 | Klein | G06F 9/5077 718/1 |
| 2016/0321588 A1 | 11/2016 | Das et al. | |

(Continued)

OTHER PUBLICATIONS

Difference between containers (Docker) and IIS, pp. 1-3 (Year: 2015).*

(Continued)

*Primary Examiner* — Albert M Phillips, III
(74) *Attorney, Agent, or Firm* — Womble Bond Dickinson (US) LLP (57) ABSTRACT

A method includes generating an instance on a host computing device in response to a request to host a web application on the host computing device, and determining a resource usage profile associated with the instance. The resource usage profile indicates one or more specific resources on the host computing device to be utilized to host the web application. The method further includes selecting one of a stored plurality of resource models based at least in part on the resource usage profile, and modifying the instance on the host computing device in accordance with the selected one of the stored plurality of resource models. The instance is modified to host the web application.

20 Claims, 6 Drawing Sheets

(56) References Cited

U.S. PATENT DOCUMENTS

2017/0199770 A1 7/2017 Peteva et al.
2017/0339196 A1 11/2017 Lewis et al.

OTHER PUBLICATIONS

Oracle Help Center (//docs.oracle.com/en/) Oracle Enterprise Manager Cloud Control Documentation, 12c Release 5, Enterprise Manager Cloud Administration Guide, 35 Getting Stated with Dynamic Resource Provisioning, (10 pages).
Cristian Mihai Barca, "Dynamic Resource Management in Vectorwise on Hadoop", Master Thesis in Parallel and Distributed Computer Systems, Aug. 2014, (113 pages).

\* cited by examiner

QUERY OPTIMIZER INJECTION FOR DYNAMICALLY PROVISIONED DATABASE CONTAINERS

TECHNICAL FIELD

Aspects of the present disclosure relate to virtual computing environments, and more particularly, constructing a set of customizable resource cost models based on varying resource usage profiles in virtual computing environments.

BACKGROUND

A virtual machine (VM) may be considered a software-based emulation of computer hardware. For example, the virtual machine may operate based on computer architecture and functions of the computer hardware resources. Thus, the virtual machine may emulate a physical computing environment, but requests for CPU, memory, hard disk, network, and other hardware resources may be managed by a virtualization layer which translates these requests to the underlying physical computing hardware resources. A database container, which may include many of the characteristics of the VM, may more generally include one or more standardized units of executable software that may be utilized to host and run the software including, for example, instructions, runtime information, tools, libraries, settings, and so forth.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Certain database container clusters such as Kubernetes™ container clusters may dynamically provision containerized databases with customized resources. For example, users may create a web application including a particular database container utilizing, for example, a certain number of central processing unit (CPU) cores, a certain size of memory, a certain size of persistent storage, and so forth. Similarly, in public cloud services, database container instances may be provisioned with auto scaling and may be shut down immediately after use. In each of the aforementioned examples, the database containers may be expected to initialize without predefined resource specifications. Specifically, because database containers may execute queries based on a cost model (e.g., how much cost spent on each resource, such as CPU, disk, memory, persistent storage, bandwidth, latency, and so forth), it may be appreciated that different cost models may result in different execution plans. Thus, the resultant performance of such database containers may vary markedly and in an unpredictable manner.

Accordingly, the present embodiments relate to methods and apparatuses for constructing a set of customizable resource cost models based on varying resource usage profiles in virtual computing environments. In certain embodiments, a host computing device may determine to deploy a database container in response to a request, for example, by a user to create a web application. In response to the request to create the web application, the host computing device may generate a database container instance (e.g., an application programming interface (API) object), and then determine a resource usage profile (e.g., number of CPUs, memory size, storage type, IOPS rate, network characteristics, and so forth that may be required to host and execute the web application most efficiently) associated with the database container instance. The host computing device may then select one or more of a stored number of resource cost models based on the resource usage profile.

For example, in some embodiments, the resource cost model may include one or more look-up tables (LUTs), one or more hash tables, or any other data structure that may be used to, for example, store and index customizable resource cost models (e.g., including resource allocation profiles that emphasize the specific resources such as processing power, memory, storage, bandwidth, latency, and so forth that would be most suitable for hosting and executing the requested web application to be referenced in creating and modifying the database containers. Specifically, once the host computing device initializes the specific database container corresponding to the requested web application, the host computing device may inject the selected stored resource cost model (e.g., selected in accordance with the resource allocation profile that emphasizes the specific resources such as processing power, memory, storage, bandwidth, latency, and so forth that would be most suitable for hosting and executing the requested web application) into the database container. In this way, the present techniques may allow a set of customizable resource cost models to be constructed based on varying resource usage profiles, such that the database container is generated in accordance with the emphasized resources (e.g., number of CPUs, memory size, storage type, IOPS rate, network characteristics, and so forth) that will be most suitable in hosting and executing the requested web application.

Figure 1:
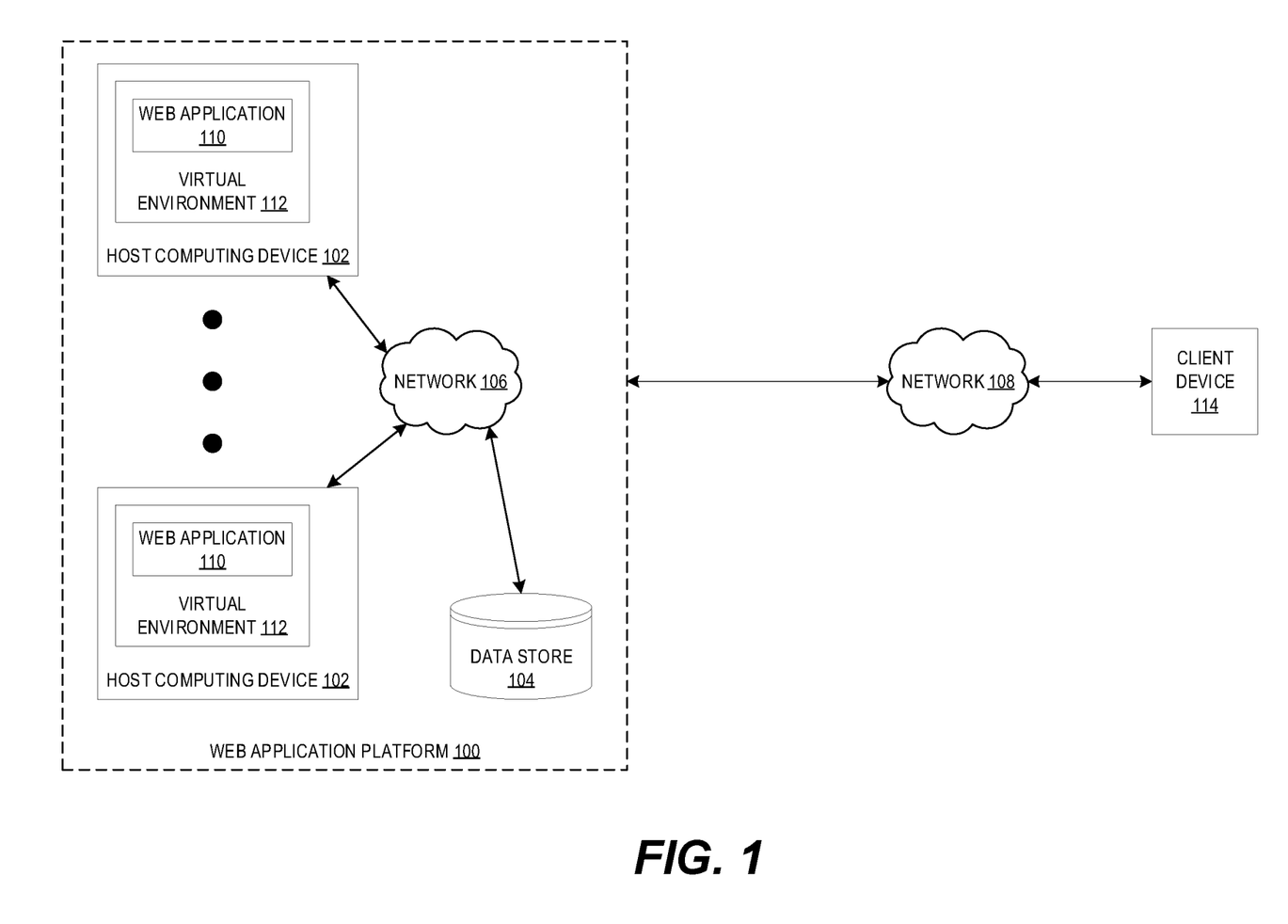
FIG. 1 is a block diagram illustrating an example web application platform, in accordance with the present embodiments.

FIG. 1 includes a web application platform 100 that may include a number of host computing devices 102, a data store 104, and a network 106. The host computing devices 102 and the data store 104 may be coupled to each other (e.g., may be operatively coupled, communicatively coupled, may communicate data/messages with each other) via network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a wireless fidelity (Wi-Fi™) hotspot connected with the network 106 and/or a wireless carrier system that can be implemented using various data processing equipment, communication towers (e.g. cell towers), etc. The network 106 may carry communications (e.g., data, message, packets, frames, etc.) between host computing devices 102 and the data store 104. The data store 104 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each computing device may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The host computing devices 102 and 120 may comprise any suitable type of computing device or machine that has a programmable processor including, for example, server computers, desktop computers, laptop computers, tablet computers, smartphones, set-top boxes, etc. In some examples, the host computing devices 102 and 120 may include a single machine or may include multiple interconnected machines (e.g., multiple servers configured in a cluster). The host computing device 102 may execute or include an operating system (OS), as discussed in more detail below. The OS of a host computing device 102 may manage the execution of other components (e.g., software, applications, etc.) and/or may manage access to the hardware (e.g., processors, memory, storage devices etc.) of the computing device.

In certain embodiments, a web application may be divided into multiple web applications 110. Each web application 110 may perform different functions, operations, actions, processes, methods, etc., for a web application and/or may provide different services, functionalities, and/or resources for the web application. For example, a first web application 110 may allow users to view streaming videos (via the web application platform 100). The web applications 110 may present graphical user interfaces (GUIs) to users via a web browser of the client device 114. The web application platform 100 may host the web application.

As illustrated in FIG. 1, each host computing device 102 may include a virtual environment 112. In one embodiment, a virtual environment 112 may be a virtual machine (VM) that may execute on a hypervisor which executes on top of the OS for a computing device, as discussed in more detail below. The hypervisor may manage system sources (including access to hardware devices, such as processors, memories, storage devices), as discussed in more detail below. The hypervisor may also emulate the hardware (or other physical resources) which may be used by the VMs to execute software/applications, as discussed in more detail below. In another embodiment, a virtual environment 112 may be a container that may execute on a container engine which executes on top of the OS for a computing device, as discussed in more detail below. The container engine may allow different containers to share the OS of a computing device (e.g., the OS kernel, binaries, libraries, etc.), as discussed in more detail below. The container engine may also perform other functions, as discussed in more detail below.

Also as illustrated in FIG. 1, each virtual environment 112 includes a web application 110. For example, web application 110 may execute in a VM or a container. Although one web application 110 is illustrated in a respective virtual environment 113, a virtual environment 112 may include multiple web applications 110 in other embodiments. In addition, the web application platform 100 may use the same type or different types of virtual environments 112. For example, each virtual environment 112 may be a VM. In another example, each virtual environment 112 may be a container. In a further example, some of the virtual environments 112 may be VMs and other virtual environments 112 may be containers.

Each virtual environment 112 may include a runtime environment (not illustrated in the figures). A runtime environment may refer to a configuration of hardware and/or software that supports the execution of different types of applications which may be written in different programming languages. Different runtime environments may allow/use different programming languages and/or different versions of programming languages.

Figure 2:
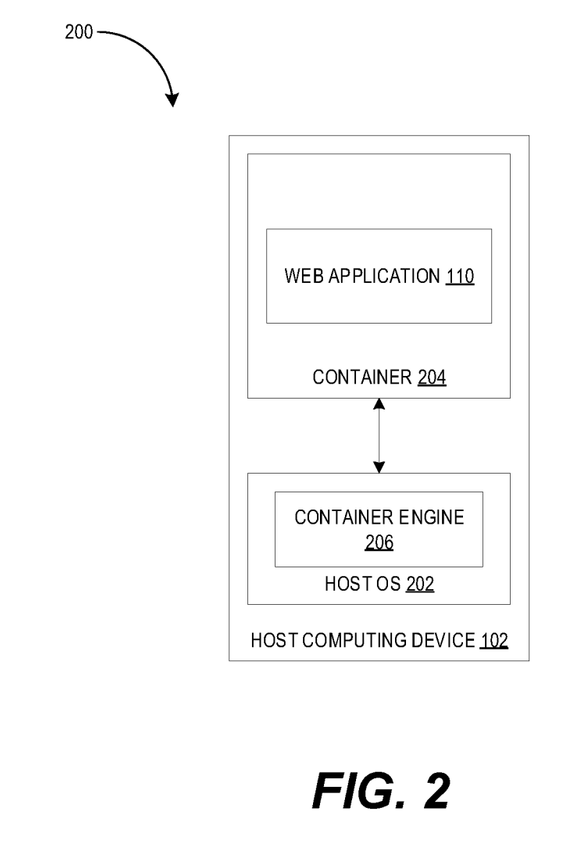
FIG. 2 is a block diagram illustrating an example virtual environment executing within a host computing device, in accordance with the present embodiments.

FIG. 2 is a block diagram that illustrates an example virtual environment 200 executing within a computing device, in accordance with some embodiments of the present disclosure. The host computing device 102 may include hardware (e.g., processing devices, memory, storage devices, other devices, etc.) and a host OS 202. As discussed above, one type of a virtual environment may be a database container 204 executing on a host computing device 102. In one embodiment, the database container 204 may be an isolated set of resources allocated to executing an application, software, and/or process independent from other applications, software, and/or processes. The host OS 202 may use namespaces to isolate the resources of the containers from each other.

In another embodiment, the database container 204 may be a virtualized object similar to virtual machines. However, the database container 204 may not implement separate guest OS. The database container 204 may share the kernel, libraries, and binaries of the host OS 202 with other containers that are executing on the host computing device 102. Although FIG. 2 illustrates one database container 204, the host computing device 102 may include multiple database containers (e.g., Kubertnes™ container cluster). Each database container may have one or more respective, filesystems, memories, devices, network ports, etc., for accessing the physical resources of the host computing device 102.

In one embodiment, the container engine 206 may allow different containers to share the host OS 202 (e.g., the OS kernel, binaries, libraries, etc.) of the host computing device 102. For example, the container engine 206 may multiplex the binaries and/or libraries of the host OS 202 between multiple database containers. The container engine 206 may also facilitate interactions between the container and the resources of the host computing device 102. For example, the container engine 206 may manage requests from the database container 204 to access a memory (e.g., a RAM) of the host computing device 102. In another example, the container engine 206 may manage requests from the database container 204 to access certain libraries/binaries of the host OS 202. In other embodiments, the container engine 206 may also be used to create, remove, manage, and modify the database containers 204. In one embodiment, the container engine 206 may be a component of the host OS 202. In another embodiment, container engine 206 may run on top of the host OS 202, or may run directly on host hardware without the use of a host OS 202.

As illustrated in FIG. 2, web application 110 (e.g., a component/part of a larger web application) may execute within the database container 204. For example, the web application 110 may execute within a runtime environment (not shown in the figures) of the database container 204. The web application 110 may be accessed and/or used by a user via a web browser of a client device. Access requests and/or data may, in some embodiments, be routed between the web application 110 and the client device via a proxy agent, for example. The web application 110 may have a runtime environment that is different than the runtime environments of other web applications (e.g., web application 110 illustrated in FIG. 1). For example, the web application 110 may be implemented using React and may execute within a runtime environment that uses React. In certain embodiments, a second web application 110 (e.g., web application 110 illustrate in FIG. 2) may be implemented using AngularJS and may execute within a different runtime environment that uses AngularJS.

Figure 3:
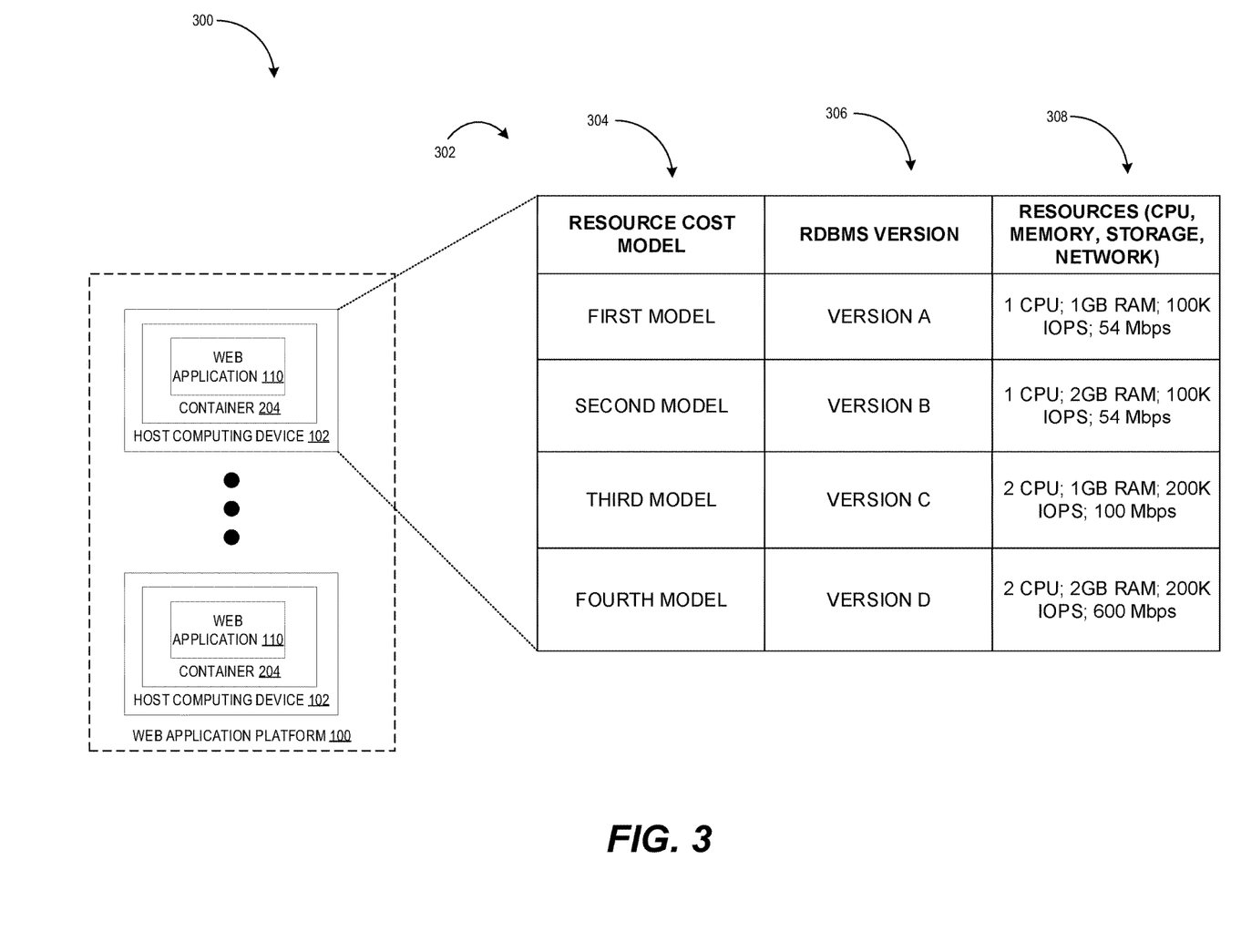
FIG. 3 is a block diagram illustrating an example web application platform including a resource cost model set, in accordance with the present embodiments.

FIG. 3 is a diagram that illustrates an example, in accordance with the present techniques. As discussed above, a user may access a web application (provided by web application platform 100) using a browser on a client device. The web application may be divided into multiple web applications and the web applications may be located within virtual environments such as database containers 204. The database containers 204 may be located on (e.g., may execute on) different host computing devices 102, as discussed above and as illustrated in FIG. 3. In certain embodiments, as further illustrated in FIG. 3, the second top most web application 110 may execute within the top most database container 204. The top most database container 204 may use a first runtime environment that may be different from the runtime environments of the other database containers 204 (e.g., on the other host computing devices 102) of the web application platform 100. For example, the top most database container 204 may use Angular version 1.5.

Figure 6:
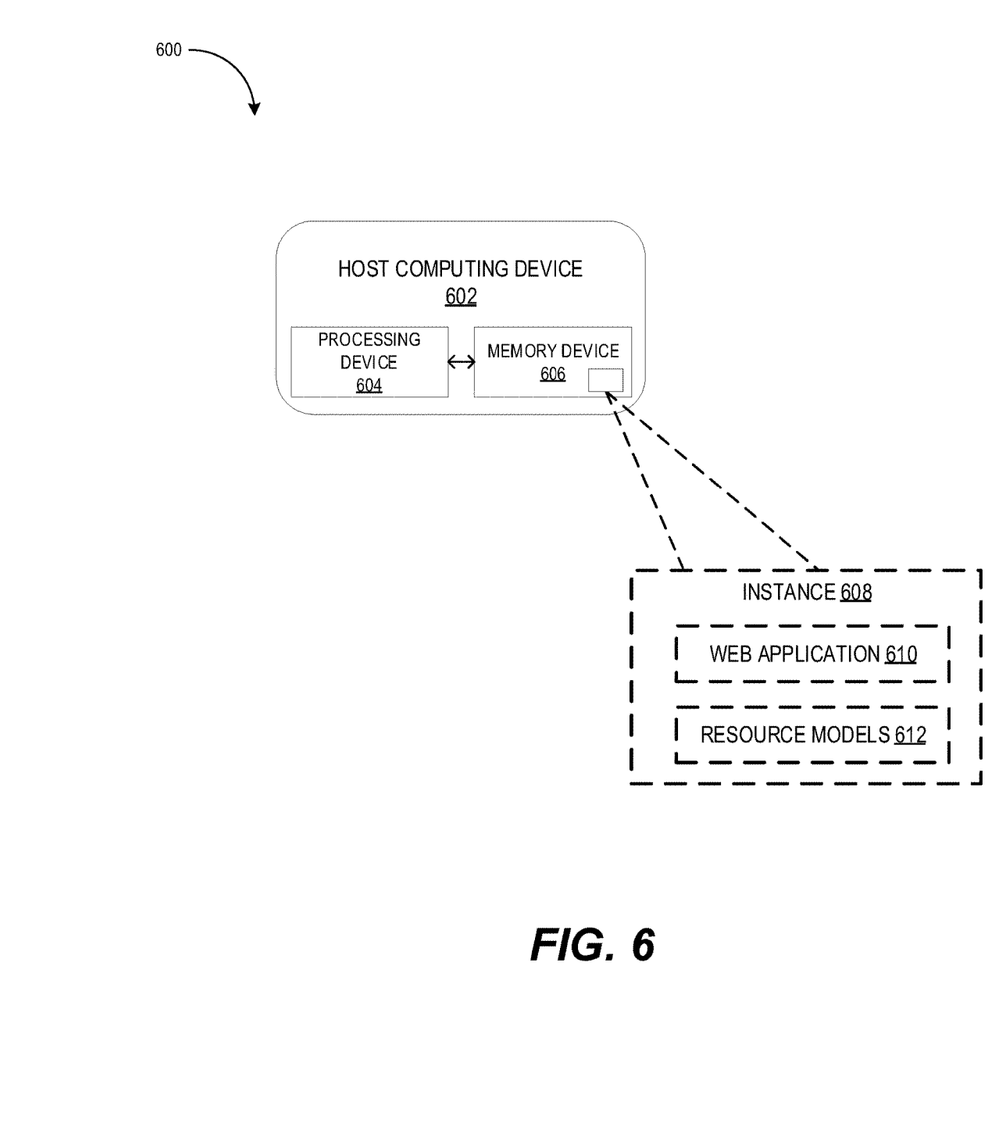
FIG. 6 is a block diagram of an example host computing device including a database container that may perform one or more of the operations described herein, in accordance with the present embodiments.

In certain embodiments, as further depicted by FIG. 3, it may be useful to provide techniques to construct a set of customizable resource cost models based on varying resource usage profiles. For example, in certain embodiments, the database container 204 may also include a resource cost model set 302. Indeed, the resource cost model set 302 may be a program or any software system stored in a memory (e.g., memory 604 as illustrated in FIG. 6) on the host computing device 102, and utilized, for example, by a processing device (e.g., processing device 602 as illustrated in FIG. 6) to carry out the presently disclosed techniques.

As depicted the resource cost model set 302 may be suitable for analyzing and storing. For example, the resource cost model set 302 may include various subsystems (e.g., software systems implemented as computer executable instructions stored in a non-transitory machine readable medium) that may be used to store data related to certain computing parameters such as CPU processing power and/or capacity (e.g., which may be expressed as a function of a number or a fraction of processing cores, including 1 CPU core, 2 CPU core, 3 CPU core, 4 CPU core, and so forth configurations), memory size (e.g., which may be expressed in units of megabytes (MB), gigabytes (GB), or terabytes (TB)), types of storage systems (e.g., HDD, SSD), input/output operations per second (IOPS) (e.g., which may be expressed as an input/output performance measurement to quantify and characterize computer storage), network characteristics such as bandwidth (e.g., which may be expressed in units of bits per second (bps), megabits per second (Mbps), or gigabits per second (Gbps)), latency, response, and so forth.

For example, in certain embodiments, as illustrated in FIG. 3, the resource cost model set 302 may include resource cost models illustrated by column 304 of the resource cost model set 302, a relatable database management system (RDBMS) versions illustrated by column 306 of the resource cost model set 302, and resource allocation profiles illustrated by column 308. In one embodiment, the resource cost model set 302 may include one or more look-up tables (LUTs), one or more hash tables, or any other data structure that may be used to, for example, store and index customizable resource cost models (e.g., including resource allocation profiles that emphasize the specific resources such as processing power, memory, storage, bandwidth, latency, and so forth that would be most suitable for hosting and executing a specific web application 110) to be referenced in creating and modifying the database containers 204.

For example, as depicted, the column 304 may include a number of specific resource cost models (e.g., "First Model," "Second Model," "Third Model," "Fourth Model," and so forth), the column 306 includes specific RDBMS software versions (e.g., "Version A," "Version B," "Version C," "Version D," and so forth), and the column 308 may include the specific resource allocation profiles (e.g., CPUs, memory, storage, network characteristics, and so forth) to be utilized to, for example, host and execute the one or more web applications 110. It should be appreciated that the resource cost model set 302 as depicted in FIG. 3 is included merely for the purpose of illustration. The implementation of the present techniques may include any number (e.g., tens, hundreds, or even thousands) of separate resource cost models each generated based on, for example, the requirements of the one or more web applications 110 and to create and modify specific container databases 204 in accordance therewith.

For example, as depicted in FIG. 3, the "First Model" (e.g., column 304 of the resource cost model set 302) may correspond to a resource cost model that may, for example, more evenly emphasize the allocation of resources (e.g., CPUs, memory, storage, network characteristics, and so forth). For example, as illustrated, the "First Model" may include 1 CPU core processing power, 1 GB of RAM memory, 100K IOPS, and 54 Mbps and correspond to RDBMS "Version A". The "Second Model" (e.g., column 304 of the resource cost model set 302) may correspond to a resource cost model that may, for example, emphasize memory resources including, for example, 1 CPU core processing power, 2 GB of RAM memory, 100K IOPS, and 54 Mbps and correspond to RDBMS "Version B."

In certain embodiments, as further depicted by the resource cost model set 302 of FIG. 3, the "Third Model" (e.g., column 304 of the resource cost model set 302) may correspond to a resource cost model that may, for example, emphasize processing power and bandwidth resources including, for example, 2 CPU core processing power, 1 GB of RAM memory, 100K IOPS, and 100 Mbps. Lastly, as further depicted, the "Fourth Model" (e.g., column 304 of the resource cost model set 302) may correspond to a resource cost model that may, for example, emphasize processing power, memory, and bandwidth resources including, for example, 2 CPU core processing power, 2 GB of RAM memory, 100K IOPS, and 100 Mbps. In this way, the present techniques may allow a set of customizable resource cost models to be constructed based on varying resource usage profiles, such that the database container 204 is generated in accordance with the emphasized resources (e.g., number of CPUs, memory size, storage type, IOPS rate, and so forth) that will be most suitable in hosting and executing a specific web application 110 requested to be hosted and executed by the database container 204.

Figure 4:
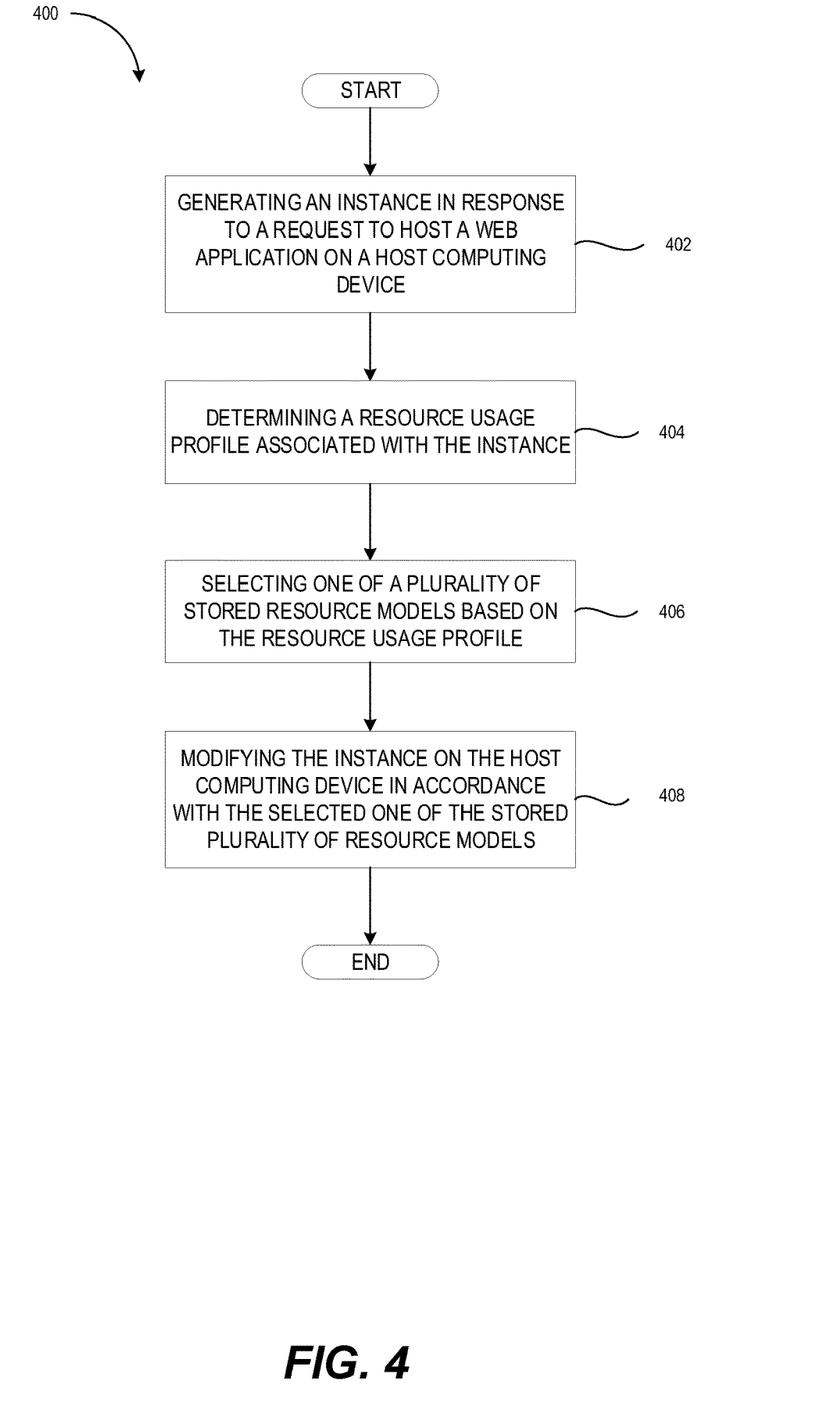
FIG. 4 is a flow diagram illustrating an embodiment of a process of constructing a set of customizable resource cost models based on varying resource usage profiles in virtual computing environments, in accordance with the present embodiments.

Turning now to FIG. 4, which illustrates is a flow diagram of a method 400 of constructing a set of customizable resource cost models based on varying resource usage profiles in virtual computing environments in accordance with the present embodiments. The method 400 may also be performed by processing logic (e.g., processing device 604 of the host computing device 602 of FIG. 6) that may include hardware (e.g., circuitry, dedicated logic, programmable logic, one or more processors, one or more processing devices, a central processing unit (CPU), a system-on-chip (SoC), etc.), software (e.g., instructions running/executing on a processing device), firmware (e.g., microcode), or various combinations thereof.

The method 400 may begin at block 402 with a processing device (e.g., processing device 604) with the processing device (e.g., processing device 604) generating an instance in response to a request to host a web application (e.g., web application 610) on a host computing device (e.g., 602). The method 400 may then continue at block 404 with the processing device (e.g., processing device 604) determining a resource a usage profile associated with the instance (e.g., instance 608). The method 400 may then continue at block 406 with the processing device (e.g., processing device 604) selected one or more of a stored number of resource models (e.g., resource models 612) based on the resource usage profile.

In certain embodiments, the method 400 may then conclude at block 408 with the processing device (e.g., processing device 604) modifying the instance (e.g., instance 608) on the host computing device in accordance with the selected one of the stored numbered of resource models (e.g., resource models 612). In this way, the present techniques may allow a set of customizable resource cost models to be constructed based on varying resource usage profiles, such that the instance (e.g., instance 608) is generated in accordance with the emphasized resources (e.g., number of CPUs, memory size, storage type, IOPS rate, network characteristics, and so forth) that will be most suitable in hosting and executing the specific web application (e.g., web application 610) requested to be hosted and executed by the instance (e.g., instance 608).

Figure 5:
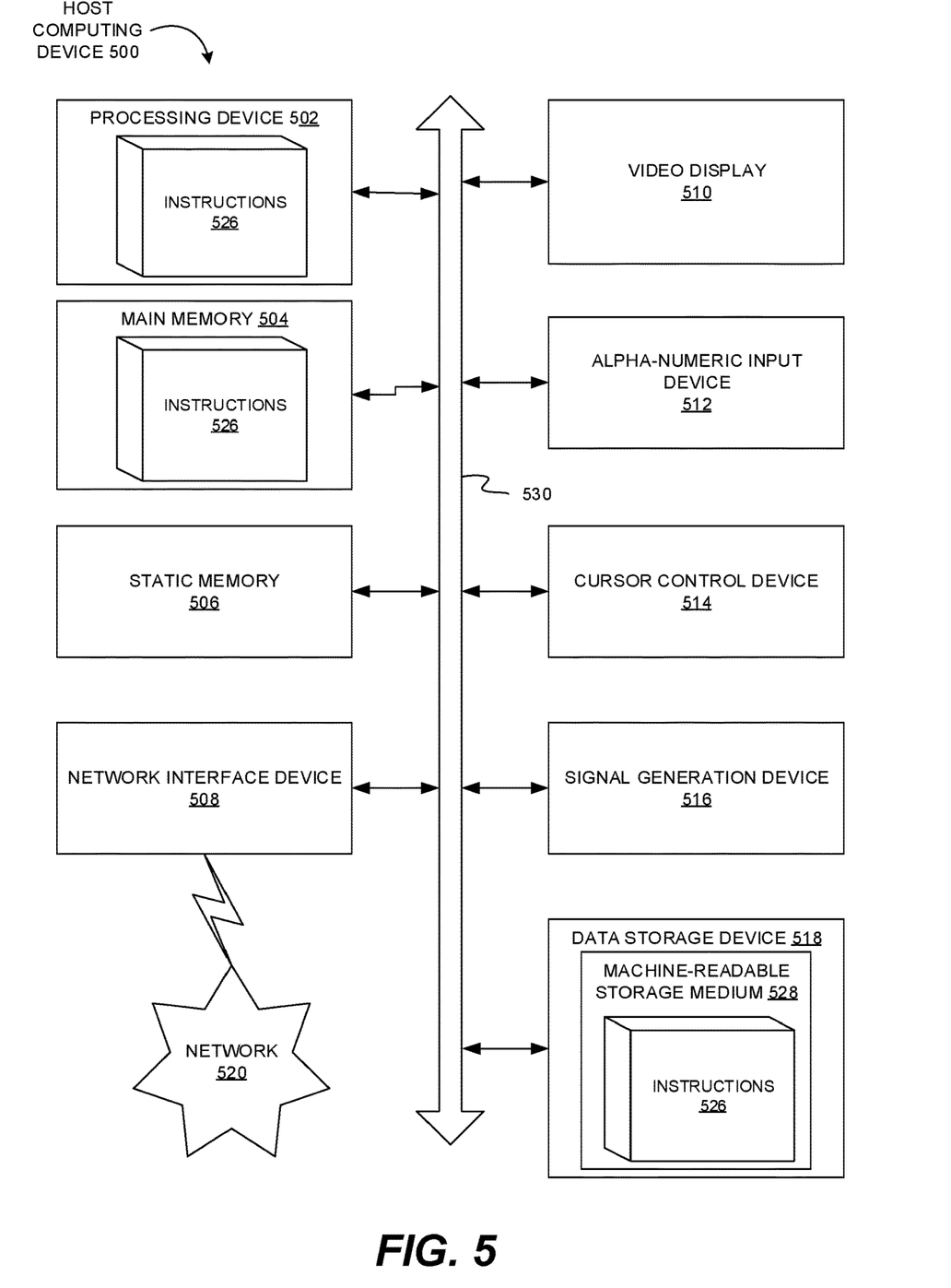
FIG. 5 is a block diagram of an example host computing device that may perform one or more of the operations described herein, in accordance with the present embodiments.

FIG. 5 is a block diagram of an example host computing device 500 that may perform one or more of the operations described herein, in accordance with some embodiments. The host computing device 500 may be connected to other computing devices in a LAN, an intranet, an extranet, and/or the Internet. The host computing device 500 may operate in the capacity of a server machine in client-server network environment or in the capacity of a client in a peer-to-peer network environment. The host computing device 500 may be provided by a personal computer (PC), a set-top box (STB), a server, a network router, switch or bridge, or any machine capable of executing a set of instructions (sequential or otherwise) that specify actions to be taken by that machine. Further, while only a single host computing device 500 is illustrated, the term "computing device" shall also be taken to include any collection of computing devices that individually or jointly execute a set (or multiple sets) of instructions to perform the methods discussed herein.

The example host computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

The host computing device 500 may further include a network interface device 408 which may communicate with a network 520. The host computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 410, alphanumeric input device 512, and cursor control device 514 may be combined into a single component or device (e.g., an LCD touch screen).

The data storage device 518 may include a computer-readable storage medium 528 on which may be stored one or more sets of instructions, e.g., instructions for carrying out the operations described herein, in accordance with one or more aspects of the present disclosure. Instructions implementing module 526 may also reside, completely or at least partially, within main memory 504 and/or within processing device 502 during execution thereof by host computing device 500, main memory 504 and processing device 502 also constituting computer-readable media. The instructions may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

FIG. 6 illustrates an apparatus 600 of an example virtual computing environment, in accordance with the present embodiments. As depicted, the apparatus 600 may include a host computing device 602, which may include a processing device 604 and a memory device 606. In certain embodiments, the host computing device 602 may include an instance 608 stored on the memory device 606. The instance 608 may host and store a web application 610, and may be utilized to, for example, provide resource models 612 (e.g., including resource allocation profiles that emphasize the specific resources such as processing power, memory, storage, bandwidth, latency, and so forth) that would be most suitable for hosting and executing the specific web application 610 to be referenced in creating and modifying the instance 608.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc.

Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   generating an instance on a host computing device in response to a request to host a web application on the host computing device;
   determining a resource usage profile associated with the instance, the resource usage profile indicating one or more specific resources on the host computing device to be utilized to host the web application;
   selecting a predefined resource model of a stored plurality of predefined resource models at least partly in view of the resource usage profile, the predefined resource model comprising a resource allocation profile most closely matching the one or more specific resources on the host computing device to be utilized to host the web application; and modifying the instance on the host computing device in accordance with the selected predefined resource model of the stored plurality of predefined resource models, the instance modified to comprise the resource allocation profile associated with the selected predefined resource model of the stored plurality of predefined resource models to host the web application.

2. The method of claim 1, wherein determining the resource usage profile associated with the instance comprises determining a number of central processing units (CPUs) to be utilized to host the web application.

3. The method of claim 1, wherein determining the resource usage profile associated with the instance comprises determining a size of memory to be utilized to host the web application.

4. The method of claim 1, wherein determining the resource usage profile associated with the instance comprises determining a type of storage to be utilized to host the web application.

5. The method of claim 1, wherein determining the resource usage profile associated with the instance comprises determining an input/output per second (TOPS) rate to be utilized to host the web application.

6. The method of claim 1, wherein selecting the predefined resource model of the stored plurality of predefined resource models comprises selecting a predefined resource model emphasizing processing power allocation.

7. The method of claim 1, wherein selecting the predefined resource model of the stored plurality of predefined resource models comprises selecting a predefined resource model emphasizing memory allocation.

8. The method of claim 1, wherein selecting the predefined resource model of the stored plurality of predefined resource models comprises selecting a predefined resource model emphasizing input/output per second (TOPS) rate allocation.

9. The method of claim 1, wherein the instance is a virtual machine (VIVI).

10. The method of claim 1, wherein the instance is a database container.

11. An apparatus, comprising:
a memory device to store a database container; and
a processing device operatively coupled to the memory device, the processing device to:
generate a database container instance on a host computing device in response to a request to host a web application on the host computing device;
determine a resource usage profile associated with the database container instance, the resource usage profile indicating one or more specific resources on the host computing device to be utilized to host the web application;
select a predefined resource model of a stored plurality of predefined resource models at least partly in view of the resource usage profile, the predefined resource model comprising a resource allocation profile most closely matching the one or more specific resources on the host computing device to be utilized to host the web application; and
modify the database container instance on the host computing device in accordance with the selected predefined resource model of the stored plurality of predefined resource models, the database container modified to comprise the resource allocation profile associated with the selected predefined resource model of the stored plurality of predefined resource models to host the web application.

12. The apparatus of claim 11, wherein to determine the resource usage profile associated with the database container instance, the processing device is to determine a number of central processing units (CPUs) to be utilized to host the web application.

13. The apparatus of claim 11, wherein to determine the resource usage profile associated with the database container instance, the processing device is to determine a size of memory to be utilized to host the web application.

14. The apparatus of claim 11, wherein to determine the resource usage profile associated with the database container instance, the processing device is to determine a type of storage to be utilized to host the web application.

15. The apparatus of claim 11, wherein to select predefined resource model of the stored plurality of predefined resource model, the processing device is to select a predefined resource model emphasizing processing power allocation.

16. The apparatus of claim 11, wherein to select predefined resource model of the stored plurality of predefined resource models, the processing device is to select a predefined resource model emphasizing memory allocation.

17. The apparatus of claim 11, wherein to select predefined resource model of the stored plurality of predefined resource models, the processing device is to select a predefined resource model emphasizing input/output per second (TOPS) rate allocation.

18. A non-transitory computer-readable storage medium including instructions that, when executed by a processing device, cause the processing device to:
generate a database container instance on a host computing device in response to a request to host a web application on the host computing device;
determine a resource usage profile associated with the database container instance, the resource usage profile indicating one or more specific resources on the host computing device to be utilized to host the web application;
select a predefined resource model of a stored plurality of predefined resource models at least partly in view of the resource usage profile, the predefined resource model comprising a resource allocation profile most closely matching the one or more specific resources on the host computing device to be utilized to host the web application; and
modify the database container instance on the host computing device in accordance with the selected predefined resource model of the stored plurality of predefined resource models, the database container modified to comprise a resource allocation profile associated with the selected predefined resource model of the stored plurality of predefined resource models to host the web application.

19. The non-transitory computer-readable storage medium of claim 18, wherein to select predefined resource model of the stored plurality of predefined resource models, the processing device is to select a predefined resource model emphasizing processing power allocation.

20. The non-transitory computer-readable storage medium of claim 18, wherein to select predefined resource model of the stored plurality of predefined resource models, the processing device is to select a predefined resource model emphasizing memory allocation.

\* \* \* \* \*